United States Patent [19]

Leshko

[11] Patent Number: 4,675,726

[45] Date of Patent: Jun. 23, 1987

[54] DRIVE ADJUSTMENT CONTROL FOR VIDEO OUTPUT STAGE

[75] Inventor: Roman W. Leshko, Chicago, Ill.

[73] Assignee: Zenith Electronics Corporation, Glenview, Ill.

[21] Appl. No.: 765,887

[22] Filed: Aug. 14, 1985

[51] Int. Cl.$^4$ ............................................... H04N 9/72
[52] U.S. Cl. .......................................... 358/34; 358/74
[58] Field of Search ...................... 358/34, 65, 74, 171, 358/172, 242

[56] References Cited

U.S. PATENT DOCUMENTS

| | | | |
|---|---|---|---|
| 4,203,131 | 5/1980 | Harwood et al. | 358/34 |
| 4,331,982 | 5/1982 | Parker | 358/243 |
| 4,414,577 | 11/1983 | Tallant et al. | 358/34 |
| 4,547,799 | 10/1985 | Rodgers | 358/74 |

*Primary Examiner*—John W. Shepperd

[57] ABSTRACT

Drive adjustment control for video output stage is provided through the use of a variable resistance network coupled with the video output stage. Variation in CRT phosphorous levels and attainment of desired white level signal gain ratios in the video output signals may be achieved through the use of the present invention. A variable resistive network is utilized to change the equivalent emitter resistance in a cascode output stage so that the white level, AC amplitude, of the video output signal may be effectively varied without affecting the black level component of the video output signal. Feedback circuitry selectively maintains a desired voltage across an emitter resistor during drive adjustment. A voltage divider network coupled to the feedback circuit maintain a second node at said desired voltage during drive adjustment. A variable resistor connected between the second node and the emitter resistor may then be varied during drive adjustment without changing the DC current drawn through the variable resistor and hence the current through the output stage. Accordingly, the DC component of the video signal is maintained at a desired value and the AC amplitude may be desirably varied by changing the setting of the variable resistor.

9 Claims, 3 Drawing Figures

DRIVE ADJUSTMENT CONTROL FOR VIDEO OUTPUT STAGE

BACKGROUND OF THE INVENTION

The present invention is generally directed to improvements in the color video processing art. More particularly, the present invention is directed toward providing improved circuitry for providing drive adjustment control for a video output stage as may be used in a wideband RGB video processor.

In television and other color video monitor applications, a color video signal typically comprises red (R), green (G), and blue (B) components. A received signal typically may be separated into R, G and B components, amplified and then applied to appropriate R, G and B inputs of a cathode ray tube (CRT) color display terminal for visual display. Also, gain, contrast and sometimes black level controls commonly may be provided for customer adjustment of the displayed video signal.

Various applications, including those in which computers contain drive circuits that interface with CRT display devices, create a desirability for the amplifying, or RGB video processing, stage to operate efficiently and accurately through a wide band of video frequencies which may be encountered. Accordingly, it is desirable to provide a wideband RGB video processor for use in color televisions and color video monitors.

However, efforts to provide a wideband RGB processor may frequently be frustrated by an undesired limiting effect on the signal slew rate caused by the relatively large voltage swings in a typical video signal.

Further, it is desirable to provide a feedback control circuit for video monitors for stabilizing the black level of the video display in overcoming other signal distortions which may be incurred during RGB processing. Such variations or distortions may be induced by the gain control circuit, or temperature fluctuations or other extraneous distortions which may be induced by component value fluctuations.

Additionally, individual CRT display terminals may vary as to their phosphorous content or other individual characteristics. Accordingly, it is desirable to provide for means for obtaining the correct balance of the AC component of the final video output signal. The correct ratio is typically particular to individual CRT. Accordingly, a factory controlled adjustment may be optimally desirable.

Thus, a principal object of the present invention is to generally overcome deficiencies which exist in the prior art and to provide an improved RGB video processor.

It is a further object of the present invention to provide a drive adjustment control for video output stage to provide for adjustment of the input-output voltage gain of the AC component of the video signal.

BRIEF DESCRIPTION OF THE FIGURES

The features of the present invention are set forth with particularity in the appended claims. The invention, together with its objects and advantages thereof, may best be understood in reference to the following detailed description taken in conjunction with the accompanying drawings in which like reference numerals are used to identify like elements and of which:

DETAILED DESCRIPTION OF THE INVENTION

The present invention generally provides for an improved analog video processor having wideband characteristics. Interconnected parallel processing channels receive respective ones of individual R, G and B voltage signals. A linearizing network interconnected with each of the R, G and B channels provides a customer contrast control for the overall video signal. In a preferred embodiment, the linearizing network is interconnected with and coupled to individual gain control circuits in each processing channel. Gain control circuits in the individual processing channels amplify the received R, G and B video voltage signals and convert them to current signals for further processing. The R, G and B current signals from the gain control circuits are then combined with a correction current to drive a low input impedance amp which converts the current signals into voltage signals to provide video information to a video output stage. The output of the video output stage is then used to drive respective R, G and B cathodes for a CRT or other suitable display device.

Further, a feedback loop is provided to supply a correction current to the low input impedance amp for maintaining a desired black level on the output signal or allowing temperature compensation and other similar functions. In the feedback loop a reference signal, a voltage signal in the preferred embodiment, implements black level control of the final R, G and B video signals. The feedback signal may be taken either directly from the output of the combining amp with the current-to-voltage conversion or from the output of the video output stage.

Figure 1:
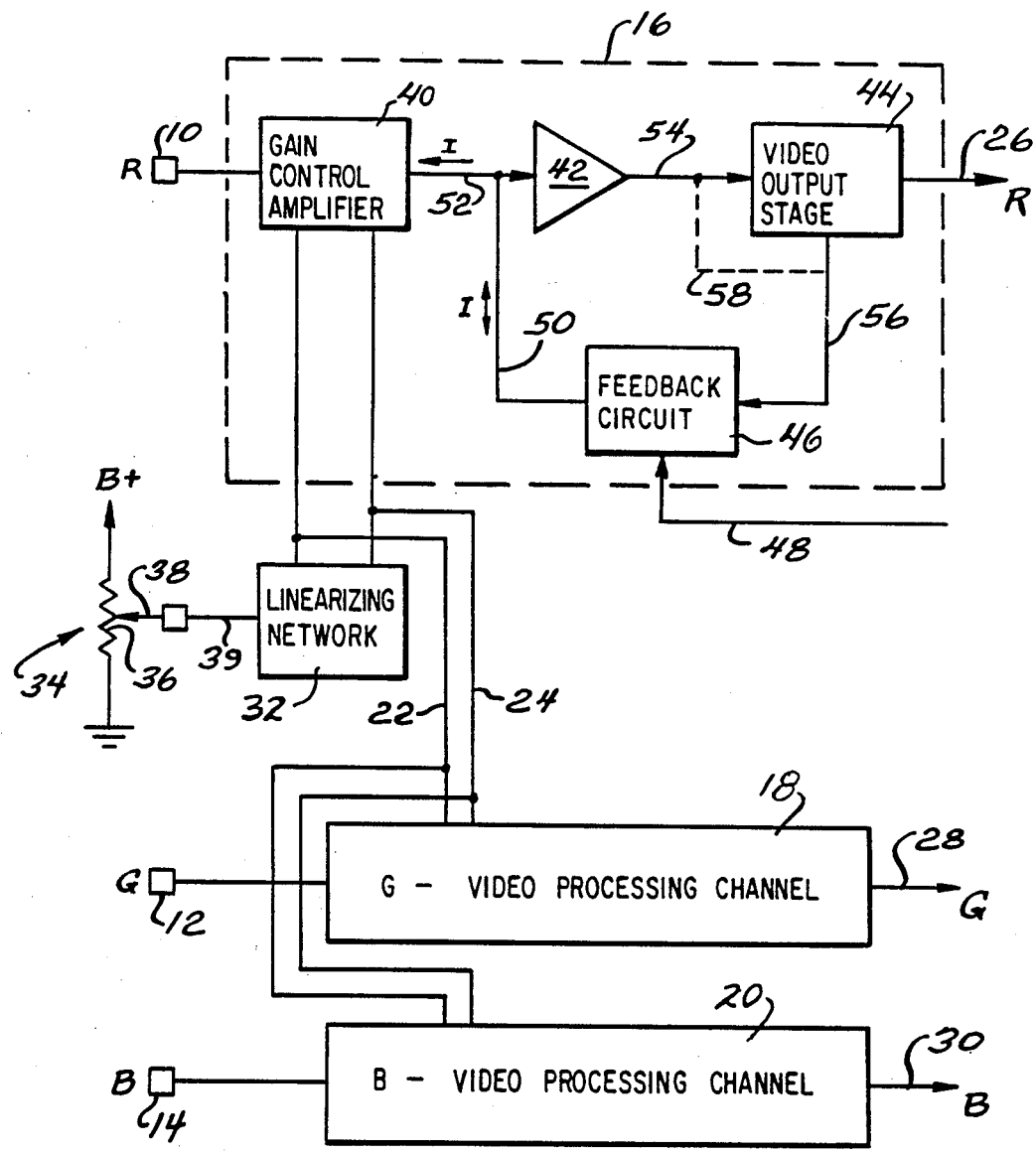
FIG. 1 is a schematic representation of a preferred embodiment of a wideband RGB video processor in accordance with the present invention.

Referring now to FIG. 1, therein is shown a schematic representation of a preferred embodiment of the present invention. The individual R, G and B components of the color video signal are received on lines 10, 12 and 14, respectively. The R, G and B signals received on the lines 10, 12 and 14 are then processed by parallel video processing channels 16, 18 and 20, respectively, which are interconnected in a parallel relationship by lines 22 and 24, to produce processed R, G and B outputs on lines 26, 28 and 30, respectively. The parallel video processing channels 16, 18 and 20 are identical; accordingly, only the R component channel 16 is shown in further detail.

Also connected to parallel lines 22 and 24 is a linearizing network 32 which is a standard circuit for interconnecting a contrast control circuit 34 with each of the video processing channels to facilitate customer control of the gain for each channel. In the embodiment illustrated in FIG. 1, the contrast control 34 comprises a potentiometer 36 connected between ground and a positive voltage with a wiper 38 coupled to the linearizing network 32 via a line 39.

More specifically, referring now to the video processing channel 16 for the R component of the color video signal, the general components of the wideband video processor of the preferred embodiment of the present invention is illustrated. In this embodiment, a gain control amplifier circuit 40 having voltage-to-current conversion capability is interconnected with a combining amplifier 42 having current-to-voltage conversion means. The combining amplifier 42 then provides an input to a video output stage 44 which supplies the processed R video component on the line 26 as mentioned previously. Black level correction and other functions may be provided in the preferred embodiment through a feedback circuit 46 which is connected to the video output stage 44 and then to the combining amp 42. The feedback means 46 receives a reference signal via a line 48 and provides the appropriate current correction signal on a line 50 to the combining amp 42. The feedback circuit 46 further includes voltage-to-voltage current conversion circuitry for converting the output voltage video signal to current signals.

More particularly, as the R (or G and B components, correspondingly) is received on the line 10, the contrast control 34 (via the linearizing network 32) controls the gain provided by the gain control amplifier 40. The gain control amplifier 40 with its included voltage-to-current conversion means converts the voltage waveform of the R component into a current waveform which is then amplified and passed via a line 52 to the combining amplifier 42. The amplified and current converted current signal on the line 52 is then combined with a correction current signal from the line 50. The resultant combined current signal is then converted by the amplifier 42 to provide a voltage output on a line 54 which then may be processed by the video output stage 44. The resultant processed R color video component on the line 26 is then made available as input to a cathode ray tube (CRT) or other suitable display device.

The voltage waveform output of the video output stage 44 may provide a feedback via a line 56 to the feedback circuit 46 for further processing. Alternatively, feedback may be provided directly from line 54 to the feedback loop and the line 56 as illustrated by the broken line 58.

In feedback circuit 46, the voltage waveform on the line 56 is compared with a voltage reference signal on the line 48. The voltage signal is then converted to a current correction signal on the line 50 which may be combined with the input current from the line 52 at the combining amp 42. Alternatively, the voltage waveform on the line 56 may be converted into a current signal and then compared with a current signal reference on the line 48 to provide the correction current desired on the line 50. In either event, the black level of the R component of the color video signal may be controlled in this fashion. Also, temperature compensation and other such functions may be provided through this feedback loop.

A preferred feedback circuit is described in detail and claimed in my copending application Ser. No. 765,888, filed on the same day as the present application and entitled "Wideband Analog RGB Video Processor With Negative Feedback Capability And Black Level Control", all of the teachings of which are hereby incorporated by reference. This referenced application also illustrates and describes a preferred video output stage. Similarly, circuitry and methodology for wideband analog RGB video processing is further described and claimed in my copending application Ser. No. 765,888.

The use of the low input impedance combining amplifier 42 allows for an extremely wideband operation. Because the signal processing occurs in terms of signal currents (instead of signal voltages), low voltage signal swing is facilitated and enhanced through the use of low input impedance, active load devices. By driving the current into and out of a low impedance, active load device, a lower bandwidth limiting time constant can be achieved. In this fashion, the slew rate is not unduly limited and an extremely wide frequency band operation is provided.

Figure 2:
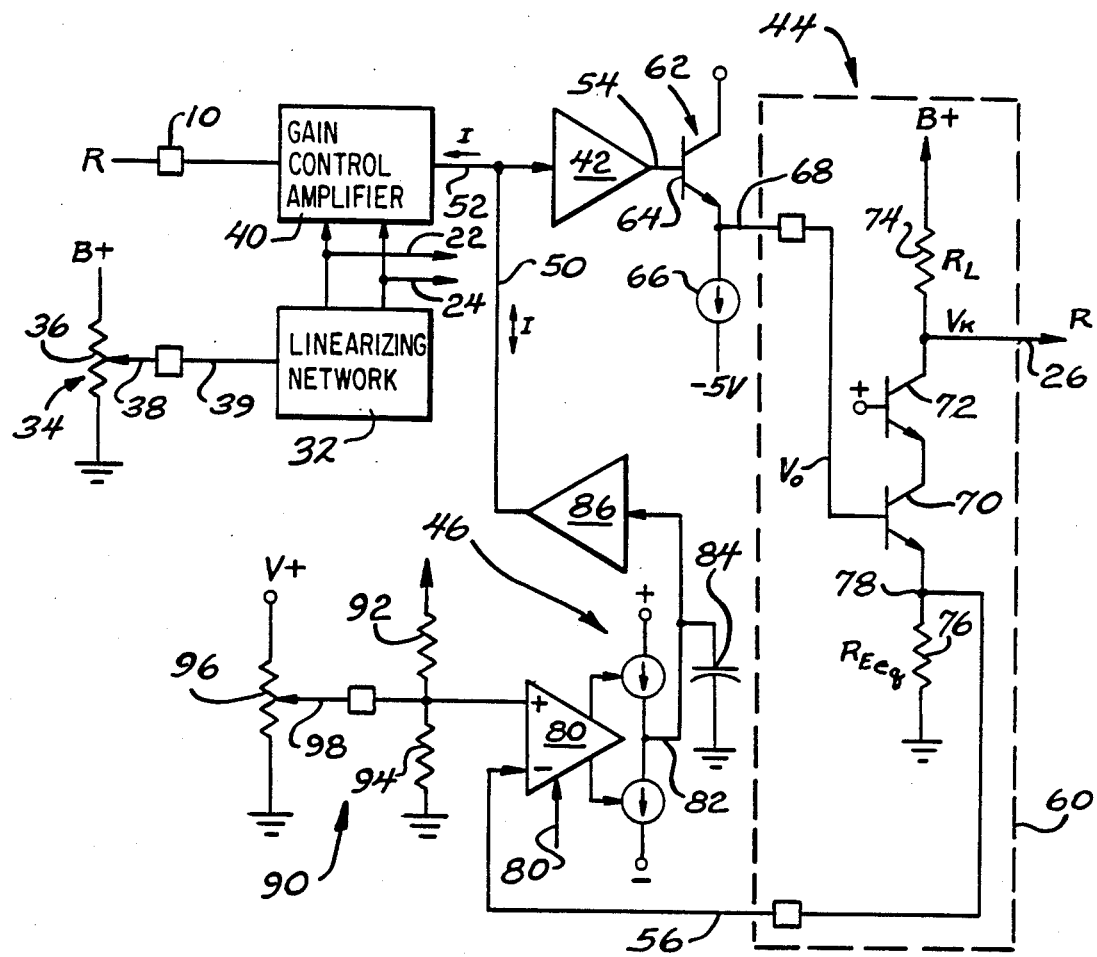
FIG. 2 is a schematic representation of a preferred embodiment of a negative feedback black level control circuit for a video monitor, including a preferred embodiment of video output stage.

Referring now to FIG. 2, therein is shown a preferred embodiment for an improved feedback control circuit for use with the wideband analog RGB video processor disclosed herein. Also illustrated is a preferred embodiment for the output stage 44 of FIG. 1. The feedback circuit 46 of FIG. 1 is also shown in greater detail with means illustrated for providing the desired reference signal on the line 48.

More particularly, the output stage 44 comprises an output amplifier circuit 60 (shown in dashed lines) with an emitter follower, a buffer amplifier 62. The emitter follower buffer 62 generally comprises a transistor 64 with a constant current source bias 66 coupled to the emitter of the transistor 64. The buffered signal is then presented on a line 68 to the output amplifier 60. In FIG. 2, the signal into the output amplifier 60 on the line 68 is represented by symbol $V_o$. $V_o$ is received by a cascode driver transistor 70 which is coupled with an output transistor 72 and a load resistor ($R_L$) 74 and with an emitter degenerating resistor ($R_E$) 76. The resistors 74 and 76 and the transistors 70 and 72 are connected in a cascode fashion between a positive voltage source, B+, and ground as shown in FIG. 2. The base of the output transistor 72 is tied to a positive voltage source to maintain the transistor 72 biased in the "on" condition.

With the circuitry shown for the output amplifier 60, the output on the line 26, $V_k$, follows at an amplified level above the input voltage, $V_o$, on the line 68. Similarly, the voltage on the line 56 from a node 78 follows the input voltage $V_o$ from the line 68 and represents a low level equivalent of the output voltage, $V_k$, of the line 26. In this fashion the cascode driver 70 operates as an emitter follower to provide a feedback signal at the anode 78 to the feedback line 56. It will be appreciated by those skilled in the art that the output voltage, $V_k$, on the line 26 is related to the input voltage, $V_o$, on the line 68 based upon the relationship between the load resistor 74, $R_L$, and the equivalent emitter resistor 76, $R_{E}(eq)$. The following formula sets forth that relationship:

$$\frac{V_k}{V_o} = \frac{-R_L}{R_{E(eq)}} \qquad \text{(Equation No. 1)}$$

In this fashion, a feedback signal is presented on the line 56 which is representative of the output signal $V_k$ on the line 26 which is used to drive the appropriate cathode of a CRT. Feedback signals generally are not taken directly from the cathode on the line 26, because the cathode is at too high a voltage to supply feedback directly. Similarly, it is undesirable to use a voltage divider on the cathode at the line 26. Such a voltage divider would increase the capacitance at the cathode and would correspondingly limit the wideband operation of the circuit as described above.

Accordingly, the circuitry of FIG. 2 allows for the feedback signal on the line 56 to be taken directly from the output stage, but at the relatively low-level node 78. This in turn allows for the feedback circuitry to provide for stabilization in response to all the variations in the DC component of the output signal which may be induced by gain control, temperature variations, output amplification or other conditions which may occur between the initial reception of the video signal and its display at the CRT. Likewise, the high voltage at the CRT cathode is avoided.

In operation, once the feedback signal is developed on the line 56, it is transmitted to the inverting terminal of a differential amplifier 80. A reference signal is then applied to the noninverting terminal of the differential amp 80 so that a push-pull current voltage signal is generated on a line 82 at the output of the differential amp 80 in conjunction with controlled current bias means 81 and 83. The current signal on the line 82 is then representative in polarity and magnitude of the difference between the reference signal on the line 48 and the feedback signal on the line 56.

The current signal on the line 82 charges or discharges the storage capacitor 84 depending on the polarity of the differential voltage signal at the inputs of the amp 80. The voltage developed across the storage capacitor 84 on the line 82 is supplied to a voltage-to-current converting amplifier 86 which generates a correction current on the line 50 to be combined with the video component current signal on the line 52. The combined current signal is then driven into the low input impedance amplifier 42 to provide signal to the output stage, and thus close a feedback loop. General feedback circuit 46 may be used to control the black level (DC component) of the video signal. Accordingly, a clocking or a gating signal is supplied on a line 88 which turns the differential amp 80 on only during the scan retrace intervals of the video signals. At that time, the video signal transmitted to the CRT comprises only the black level (DC component) signal with no video (AC component) information. Accordingly, the feedback signal on the line 56 will represent the black level voltage of the overall signal as presented to the CRT. Correspondingly, that can then be compared to the desired black level reference voltage signal on the line 48, and a current signal of the appropriate magnitude and polarity can be generated on the line 82. Both the differential amp 80 outputs and the voltage-to-current conversion amp 86 inputs are designed for a very high impedance operating level. Accordingly, once the gating pulse on the line 88 terminates, the differential amp 80 turns off and presents a high impedance to the storage capacitor 84. Accordingly, the voltage developed across the storage capacitor 84 is stored during the succeeding horizontal video line. Because the capacitor 84 sees only high impedance, it does not significantly discharge during the horizontal line scan time interval. Correspondingly, a virtually constant correction current is generated at the output of the voltage-to-current conversion amp 86 on the line 50 for combination with the component current signal from the line 52. When the next successive scan retrace interval occurs, the black level voltage is again sampled and a new current signal generated on the line 82, which then either charges or discharges the storage capacitor 84, so that the voltage presented to the voltage-to-current conversion amp 86 for the succeeding horizontal video line will reflect the most recent information from the sampled video output.

The black level voltage reference on the line 48 may be controlled by the customer through the use of a black level signal reference circuit 90 which generally comprises a voltage divider of resistors 92 and 94 with a potentiometer 96. A wiper 98 of potentiometer 96 varies the voltage between a positive voltage and ground as the customer may desire.

As explained above, the general circuitry of the feedback control FIG. 46 is that of a sample and hold system to correspond to the fact that the black level voltage of the video output signal is measurable only one per every scan retrace interval, on an practical basis.

The circuitry of the novel feedback black level control circuit described in conjunction with the preferred embodiment of FIG. 2 provides for greater stability in the resultant video signal. In the circuitry of the preferred embodiment, the feedback swamps out the base-to-emitter voltages which may otherwise distort the black level reference. Similarly, by controlling the voltage across the emitter resistor 76 ($R_E$), the current through the output stage may be readily controlled. Accordingly, a sampling of the output signal for a feedback from the node 78 controls the entire output stage. Similarly, greater stability is provided in this fashion because lower temperature coefficient resistors may be used, which provides greater sensitivity and allows the feedback loop to operate more efficiently.

Figure 3:
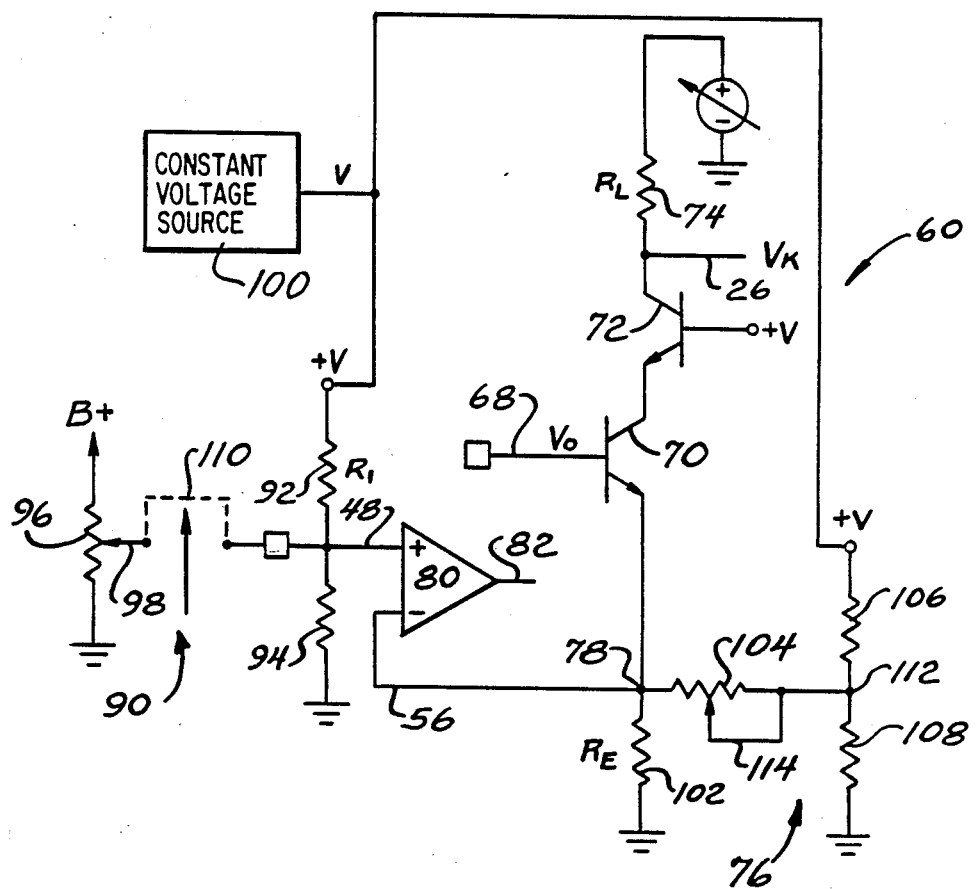
FIG. 3 is a schematic representation of a preferred embodiment of a drive adjustment control for the video output stage of the present invention.

Referring now to FIG. 3, therein is shown a preferred embodiment for drive adjustment control means in the video output stage 60. Circuitry of FIG. 3 represents a slightly different configuration of the same elements of the output stage 60 coupled to the feedback circuit means of FIG. 2. As illustrated, the resistance 76 of FIG. 2 comprises an emitter resistor 102 coupled by means of a potentiometer 104 to the common node of voltage divider comprising a pair of resistors 106 and 108. The high end of the voltage divider network of the resistors 106 and 108 is tied to a constant voltage source 100 which is also tied to the high end of the voltage divider network of a pair of resistors 92 and 94 in the black level signal reference circuit 90 of the feedback circuitry. The line 82 on the output of amplifier 80 represents the same line 82 as in FIG. 2 where it is coupled with the storage capacitor 80 for the conversion amplifier 86. The $V_o$ input line 68 at the transistor 70 represents the same line 68 illustrated in FIG. 2 whereby the feedback circuit is completed from the line 82 to the line 68 as illustrated in FIG. 2.

Selective variation in the white level, or AC amplitude, of the video output signal on line 26 may be provided by means of the drive adjustment control circuitry of FIG. 3. More particularly, a jumper 110 removes the potentiometer 96 from the black level signal reference circuit 90. Accordingly, the voltage at the noninverting input on the line 48 at the noninverting input of the differential amp 80 will be determined by the voltage divider network of the resistor 92 and the resistor 94. As mentioned above, the positive voltage tied to the high end of voltage divider network of the resistors 92 and 94 is provided from the control voltage source 100 and is also tied to the high end of the voltage divider network of the resistors 106 and 108. In the preferred embodiment of the present invention, the resistors 106 and 108 are selected to provide a voltage at a node 112 which is equal to the voltage present on the line 48 when the jumper 110 has been removed.

As explained in conjunction with the explanation of the feedback circuitry of FIG. 2, the voltage on the line 56 and hence the voltage at the node 78 is desirably stabilized at the black level signal reference on the line 48 during the nonvideo intervals of each horizontal scanning line. Accordingly, the voltage at the node 78 should be equal to the voltage on the line 48 and correspondingly the voltage at the node 112 when the jumper 110 is removed.

Because the voltage on the node 78 is equal to the voltage on the node 112, during drive level adjustment, there will be no voltage drop across the potentiometer 104. Accordingly, the wiper 114 of the potentiometer 104 may be varied without affecting the current drawn through the output stage 60. Thus, although the current through the output stage 60 is not affected by changing the potentiometer 104, the equivalent emitter resistance 76 is varied. This provides a variation in the output signal on the line 26 as given by equation No. 1 above.

Hence, the white level, AC amplitude of the video output signal on the line 26 may be varied effectively without increasing the DC current through the output stage 60. Consequently, the black level of the signal is unaffected as it is controlled through the feedback circuit described above. Accordingly, adjustment may be made in the AC drive level of the video output signal on the line 26 to compensate for individual characteristics and peculiarities of individual CRT display terminals. For example, the different phosphorous content of the CRT terminals may be overcome and the desired white level ratio achieved by means of the circuit. Once the white level (AC) of the video output signal is adjusted, the jumper 110 may be replaced and the circle will then operate as described above in conjunction with the feedback circuitry of FIG. 2.

Because it is likely that the video drive level will need to be adjusted only once as to the RGB video processor and CRT terminal are typically dedicated, the jumper 110 and the potentiometer 104 need not be customer accessible control. Adjustment need be made only once at the factory level. Hence, no additional costs are incurred providing external control for the customers, yet a desired video drive level adjustment is achieved at the output stage 60.

The voltage-to-current and current-to-voltage conversion utilized in the preferred embodiment of the present invention may be accomplished in any acceptable function. Circuits to perform these functions are readily available and will not be described further at this point. However, it is desirable that such circuits carefully maintain the integrity of the video information during the conversion from component video voltage signals into component video current signals and back.

The circuitry of the preferred embodiment of the present invention also may be utilized to carry out a method of RGB video processing in accordance with the present invention. More particularly, as R, G and B component video voltage signals are received, they are converted to R, G and B component video current signals and amplified to provide a desired gain. Once the component video current signals have been amplified, they are driven into a low input impedance device which reconverts the component video signals into component video voltage signals for driving the appropriate R, G and B inputs of a video display device.

Additionally, a feedback signal may be used to coordinate the output component video voltage signal with the received signals. More particularly, a feedback signal may be taken either from the output of the low input impedance combining circuit 42 or the video output circuit 44. The feedback signal is then compared with a reference signal to produce a correction current signal. The correction current signal is then combined with the component video current signals and converted into component video voltage signals for driving video display devices.

In this fashion, the component signals supplied to the video display device represent a combination of the amplified, received component video signals and the feedback information. As mentioned previously, the feedback information may be reflective of temperature compensation or black level adjustment or other desired function. Also, as the feedback is accomplished through the appropriate component video current signal driven into a low output impedance device, wideband operation is facilitated and the signal slew rate is not unduly affected.

In both the method and apparatus of the present invention, the individual component video channels may be isolated. Although only one overall contrast control is illustrated in the preferred embodiment, each R, G and B processing channel could be individually controlled to vary the gain of each, independently of the others. Similarly, each feedback loop may be operated independently if desired, for example, the black level on the R video component may be varied independently of the G and B components. Alternatively, of course, the overall black level of the video output signal may be controlled by supplying a single reference signal on the line 48 to each of the video component channels 16, 18 and 20.

Although described above in terms of a preferred embodiment, the present invention is set forth with particularity in the appended claims. Such modifications as would be apparent to one skilled in the art and familiar with the teachings of the present invention are deemed to fall within the scope of the appended claims.

What is claimed is:

1. In a video processor having an output stage including output driver means and feedback circuitry to stabilize the black level of the video output signal, drive adjustment control means for adjustably and selectively varying the AC gain of the video output signal comprising:

black level reference signal means coupled to said feedback circuitry to stabilize the black level of said video output signal at a desired voltage;

variable resistive network means in series with said output driver means in said output stage and coupled to said black level reference signal means so as to vary the effective resistance in said output stage and, the AC gain correspondingly without varying the current through said output stage.

2. The drive adjustment control means of claim 1 wherein said variable resistance network means comprises:

a first resistor coupled to said output stage and to ground so that said desired voltage black level is maintained across said first resistor during drive adjustment;

a voltage divider circuit comprised of at least two resistors to maintain the junction of said two resistors at said desired voltage during drive adjustment; and a variable resistor coupled between the junction of said first resistor and said output stage and the junction of said two resistors in said voltage divider, whereby the value of said variable resistor may be varied to vary the effective resistance of said variable resistive network and correspondingly vary the AC gain of the output stage, and whereby there is no DC voltage drop across said variable resistor during drive adjustment and no corresponding DC current variation.

3. A video output stage for a video processor having feedback circuitry for stabilizing black level in the output signal, said output stage having drive adjustment control means for the video output comprising: a load resistor, output transistor and cascode driver transistor connected in a cascode fashion whereby the video signal is received at the base of the cascode driver transistor and the video output signal is generated at the collector of the output transistor;

a resistive network coupled to the emitter of said cascode driver so that the gain of said output stage is proportional to the value of said resistive network, said resistive network comprising an emitter resistor coupled between said emitter and ground, a variable resistor coupled between said emitter and the junction of a voltage divider, and said voltage divider comprised of at least two resistors coupled between a selected voltage source and ground, said voltage divider resistors being chosen to provide a desired voltage at said junction during drive adjustment; and means for selectively providing said desired voltage as a black level reference signal to said feedback circuitry during drive adjustment, whereby the voltage across said emitter resistor and the current through said emitter resistor are fixed by said desired voltage during drive adjustment and whereby said variable resistor may be varied to adjust the value of said resistive network and the gain of said output stage.

4. A RGB video processing system comprising:

signal amplification means for receiving and amplifying individual RGB video signals;

signal combining means coupled to said signal amplification means to combine said amplified individual RGB video signals with correction signals;

output stage means for providing said combined signals to appropriate display means;

feedback means coupled to said output stage and reference signal means to compare the signal at said output stage with the signal from said reference signal means to provide said correction signal to said combining means to stabilize said output stage signal; and drive adjustment means coupled to said output stage to adjustably and selectively vary the AC gain of said output stage signal, said drive adjustment means including variable resistive network means for varying the effective resistance in said output stage without varying the current through said output stage.

5. The RGB video processing system of claim 4 further including:

means coupled to said reference signal means to provide a preselected black level reference signal to said feedback means during drive adjustment, said means being further coupled to provide said reference signal to said variable resistive network means.

6. The RGB video processing system of claim 5 wherein said output stage comprises:

driver means coupled to receive said combined signals and coupled to said variable resistive network;

output means coupled to said driver means in a cascode fashion opposite said variable resistive network means; and load means coupled between selected biasing means and said output means whereby said output stage signal is generated at said junction of said load means and said output means.

7. The RGB video processing system of claim 6 wherein said feedback means is coupled to said output stage at the junction of said driver means and said variable resistive network means.

8. The RGB video processing system of claim 7 wherein said variable resistive network means comprises:

first resistance means coupled between said driver means and ground;

second resistance means coupled to said reference signal means;

third resistance means coupled to said second resistance means and to ground, said third resistance means having a value in relation to the value of said second resistance means whereby said preselected black level reference signal is generated at the junction of said second and third resistance means, at least during drive adjustment; and variable resistance means coupled between said junction of said driver means with said first resistance means and said junction of said second resistance means with said third resistance means, whereby the voltage drop across said variable resistance means is approximately zero during drive adjustment so that the effective resistance of said variable resistive network means may be varied to vary the AC gain of said output stage without varying the DC current through said output stage.

9. The RGB video processing system of claim 4 further including:

first means coupled to said reference signal means to selectively vary the reference signal provided to said feedback means; and selectively operable second means coupled to said first means to isolate said first means from said reference signal means and said feedback means during drive adjustment.

* * * * *